United States Patent
Kapels et al.

(10) Patent No.: US 7,915,879 B2
(45) Date of Patent: Mar. 29, 2011

(54) SWITCHING CONVERTER INCLUDING A RECTIFIER ELEMENT WITH NONLINEAR CAPACITANCE

(75) Inventors: Holger Kapels, Hozkirchen (DE); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 423 days.

(21) Appl. No.: 12/164,672

(22) Filed: Jun. 30, 2008

(65) Prior Publication Data
US 2009/0322293 A1 Dec. 31, 2009

(51) Int. Cl.
*G05F 1/10* (2006.01)
(52) U.S. Cl. ......... 323/282; 323/284; 323/285; 323/286
(58) Field of Classification Search .................. 323/222, 323/223, 224, 282, 284, 285, 286, 351; 363/21.12
See application file for complete search history.

(56) References Cited

U.S. PATENT DOCUMENTS

| | | | | |
|---|---|---|---|---|
| 4,449,174 A | * | 5/1984 | Ziesse | 323/282 |
| 4,605,999 A | * | 8/1986 | Bowman et al. | 363/19 |
| 5,880,940 A | * | 3/1999 | Poon | 363/20 |
| 6,051,961 A | * | 4/2000 | Jang et al. | 323/224 |
| 7,385,833 B2 | * | 6/2008 | Keung | 363/56.12 |

FOREIGN PATENT DOCUMENTS
DE 103 26 739 B3 3/2005
* cited by examiner

Primary Examiner — Quyen Leung
Assistant Examiner — LaKaisha Jackson
(74) Attorney, Agent, or Firm — Dicke, Billig & Czaja, PLLC

(57) ABSTRACT

A switching converter including a rectifier element with nonlinear capacitance. One embodiment provides a switching element configured to be driven in the on state and in the off state. A first capacitive element is between the load path terminals of the switching element and has a nonlinear capacitance characteristic curve dependent on a voltage between the load path connections. A rectifier element is coupled between the inductive storage element and the capacitive storage element such that it enables a current flow between the inductive storage element and the capacitive storage element when the switching element is driven in the off state. A second capacitive element is between the load path terminals of the rectifier element and has a nonlinear capacitance characteristic curve dependent on a voltage between the load path connections.

25 Claims, 7 Drawing Sheets

SWITCHING CONVERTER INCLUDING A RECTIFIER ELEMENT WITH NONLINEAR CAPACITANCE

BACKGROUND

A switching converter serves for converting an input voltage, which can be applied to input terminals, into an output voltage, which is available at output terminals. There are various switching converter topologies. What is common to these switching converter topologies is that at least the following circuit components are present: an inductive storage element, a switching element, a rectifier element and a capacitive storage element. During the operation of the switching converter, the switching element is switched on and off cyclically. The individual circuit components are connected up in such a way that the inductive storage element buffer stores energy during switched-on phases of the switching element and outputs at least part of the stored energy during a subsequent switched-off phase to the capacitive storage element via the rectifier element.

Transitions from a switched-on phase to a switched-off phase of the switching element are critical with regard to electromagnetic interference radiation and critical with regard to overvoltages that can occur at parasitic inductances if a current flowing through the switching element changes rapidly. During such a transition phase, a current through the inductive storage element that flows through the switching element during the switched-on phase has to be accepted by the rectifier element. Extremely high changes in voltages present across the switching element and the rectifier element, and in currents flowing through these components can occur during this transition.

SUMMARY

One embodiment of the present description provides a switching converter including a switching element, which can be driven in the on state and in the off state. A first capacitive element is between the load path terminals of the switching element and has a first capacitance having a nonlinear capacitance characteristic curve that is dependent on a voltage between the load path connections. A rectifier element connected between the inductive storage element and the capacitive storage element configure such that it enables a current flow between the inductive storage element and the capacitive storage element when the switching element is driven in the off state. A second capacitive element is between the load path terminals of the rectifier element and has a second capacitance having a nonlinear capacitance characteristic curve that is dependent on a voltage between the load path connections.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
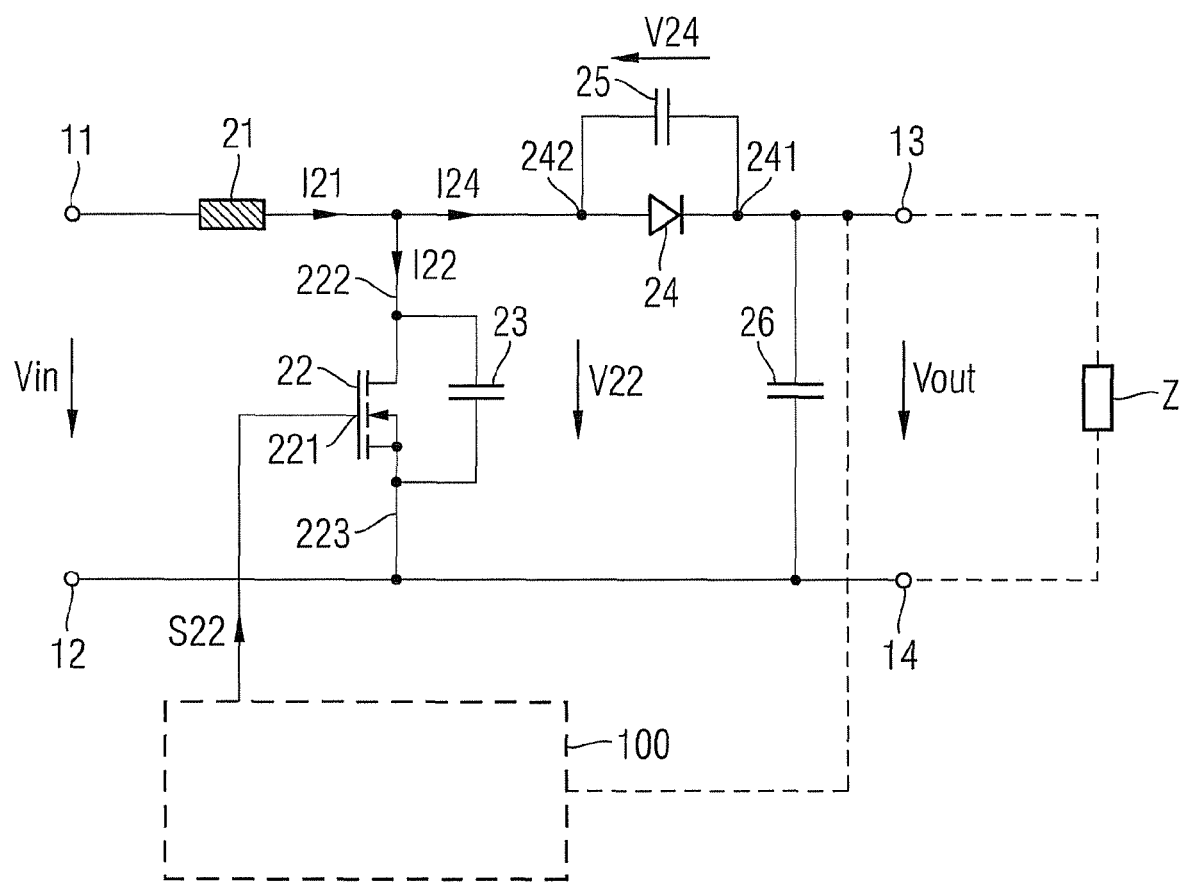
FIG. 1 illustrates one embodiment of a switching converter on the basis of an electrical equivalent circuit diagram.

FIG. 1 illustrates one embodiment of the electrical equivalent circuit diagram of a switching converter, which is embodied as a boost converter in the example illustrated. This switching converter has input terminals 11, 12 for applying an input voltage Vin and output terminals 13, 14 for proving an output voltage Vout. In the switching converter illustrated by way of example, one 12 of the input terminals and one 14 of the output terminals are at a common electrical potential, for example a reference potential, such as e.g., ground.

The switching converter has an inductive storage element 21, a switching element 22, a rectifier element 24 and a capacitive storage element 26. The inductive storage element 21 can be in one embodiment a choking coil having an inductor core (not illustrated). The capacitive storage element 26 is connected between the output terminals 13, 14 and serves for providing the output voltage Vout. This capacitive storage element 26 is realized as a capacitor, for example, and is also referred to hereinafter as output capacitor of the switching converter. The switching element 22 has a control terminal 221 for feeding in a control signal S22 and also load path terminals 222, 223 and a load path running between the load path terminals 222, 223. The switching element 22 can be driven in the on state and in the off state, or switched on and off, by using the control signal S22 and is connected up in such a way that the inductive storage element 21 can take up electrical energy via the input terminals 11, 12 when the switching element 22 is switched on. In the boost converter illustrated in FIG. 1, the load path of the switching element 22 is connected in series with the inductive storage element 21 for this purpose, wherein the series circuit including the inductive storage element 21 and the switching element 22 is connected between the input terminals 11, 12.

The rectifier element 24 is connected up in such a way that, when the switching element 22 is driven in the off state, the rectifier element enables a current flow from the inductive storage element 21 to the capacitive storage element 26, but prevents a current flow from the output capacitor in a direction of the inductive storage element. In the example illustrated, for this purpose the rectifier element 24 is connected between the inductive storage element 21 and the capacitive storage element 26. In the example, the rectifier element 24 and the capacitive storage element 26 form a series circuit connected in parallel with the switching element 22.

The rectifier element 24 has load path terminals 241, 242 with a load path running between the load path connections 241, 242. The rectifier element is a diode, for example, which is connected in the forward direction between the inductive storage element 21 and the capacitive storage element 26. In this case, a cathode terminal of the diode forms the first load path terminal 241, and an anode terminal of the diode forms the second load path terminal 242. Even though the circuit symbol of a bipolar diode is illustrated in the electrical equivalent circuit diagram in FIG. 1, it should be pointed out that either a bipolar diode or a Schottky diode can be used as the diode.

The switching element 22 can be driven in a conventional manner by a drive circuit 100 (illustrated by dashed lines), which provides a pulse-width-modulated signal that is fed to the control terminal 221 of the switching element 22 as switching signal S22.

The basic functioning of the switching converter illustrated in FIG. 1 is explained below with reference to FIG. 2, which illustrates by way of example temporal profiles of the following signals: of a current I21 through the inductive storage element 21, which is also referred to hereinafter as inductance current; of the drive signal S22; of a voltage V22 across the load path of the switching element 22, which is also referred to hereinafter as first load path voltage; and a voltage V24 across a load path of the rectifier element 24, which is also referred to hereinafter as second load path voltage. It shall be assumed for the explanation below that the voltage V24 across the rectifier element is a positive voltage if the rectifier element is reverse-biased when the switching element 22 is driven in the on state. The rectifier element illustrated is reverse-biased if a positive voltage is present between the first and second load path connections.

For further explanation, a drive period of the switching element 22 shall be considered, during which drive period the switching element 22 is driven in the on state or switched on, for a switched-on duration Ton, and is driven in the off state, or switched off, for a switched-off duration Toff. The time duration during which the switching element 22 is switched on is also referred to hereinafter as switched-on phase; the time duration during which the switching element 22 is switched off is also referred to hereinafter as switched-off phase.

If the ohmic resistance of the switching element 22 in the switched-on state is disregarded, then approximately the entire input voltage Vin is present across the inductive storage element 22 during the switched-on phase. A current I21 through the inductive storage element 21 arises during this switched-on phase. The inductive storage element 21 is magnetized during this switched-on phase, that is to say that electrical energy is stored in the inductive storage element 21. A change in the current I21 with respect to time is dependent on the input voltage during this switched-on phase and is all the greater, the greater the amplitude of the input voltage Vin is. As long as a magnetization state of the inductive storage element 21 remains below a saturation region, the change in the current with respect to time is approximately proportional to the input voltage, which is taken as a basis for the illustration in accordance with FIG. 1. The rectifier element 24 is reverse-biased during the switched-on phase. If the ohmic resistance of the switching element 22 during the switched-on phase is disregarded, then approximately the output voltage Vout is present across the rectifier element 24 during the switched-on phase.

If the switching element 22 is driven in the off state, then the electrical potential at the node common to the inductive storage element 21 and the rectifier element 24 rises until the rectifier element 24 is forward-biased and thus enables a current flow from the inductive storage element 21 to the capacitive storage element 26. The electrical potential at the node common to the inductive storage element 21 and the rectifier element 24 then corresponds to the sum of the forward voltage of the rectifier element 24 and the output voltage Vout. In bipolar diodes or Schottky diodes, the forward voltage is at most in the region of a few volts and is usually negligibly small in comparison with the output voltage Vout, which can be in the region of a few hundred volts. A boost converter illustrated in FIG. 1 serves for example for converting an input voltage Vin resulting from a mains voltage into a intermediate circuit voltage. In one embodiment, values for the intermediate circuit voltage are in this case in the region of 400V.

The current I21 through the inductive storage element 21 decreases during the switched-off phase. In this case, a change in the current I21 with respect to time during the switched-off phase is dependent on a difference between the input voltage Vin and the output voltage Vout. Overall, the current I21 through the inductive storage element 21 has a triangular current profile. In this case, the switching element 22 can be driven in such a way that the current decreases to zero between two drive periods. In this context this is referred to as a discontinuous current mode (DCM). However the switching element 22 can also be driven in such a way that the current I21 is always greater than zero. In this context this is referred to as a continuous current mode (CCM).

The drive circuit 100 can vary the duty cycle of the drive signal S22 and/or the switching frequency with which the switching element is switched on and off, in order to regulate the output voltage Vout largely independently of the current taken up by a load Z that can be connected to the output terminals 13, 14 (illustrated by dashed lines). For this purpose, information about the output voltage Vout is fed to the drive circuit 100. A decrease in the output voltage Vout as the current taken up by the load Z increases can be counteracted, for example, by increasing the duty cycle, that is to say increasing the switched-on duration Ton in comparison with the total duration Tp of the drive period. An increase in the output voltage Vout as the current taken up by the load Z decreases can be correspondingly counteracted by reducing the duty cycle, that is to say by reducing the switched-on duration Ton in comparison with the total duration Tp. Such regulating methods either for a DC mode or a CC mode are sufficiently known, such that further more detailed explanations in this respect are not required.

Irrespective of the operating mode (CCM or DCM) and irrespective of specific regulating methods for regulating the output voltage Vout, the transition of the switching element 22 from the switched-on phase to the switched-off phase can be critical with regard to overvoltage spikes. During the transition from the switched-on phase to the switched-off phase, referring to FIG. 2, the load path voltage V22 of the switching element 22 arises from a minimum value $V22_{min}$ to a maximum value $V22_{max}$. In this case, the minimum value $V22_{min}$ corresponds to the voltage drop across the switching element 22 driven in the on state. The switching element 22 is for example a power MOS transistor having a dielectric strength of a few hundred volts, for example 600V. The voltage drop of such a component is in the region of a few volts if the component is driven in the on state. The maximum value $V22_{max}$ of the load path voltage V22 of the switching element 22 is in the region of the output voltage Vout, which is for example in the region of few hundred volts.

$I21_{max}$ shall hereinafter designate the value of the current through the inductive component 21 which is reached at the instant when the switching element 22 is switched off. The inductance current I21 flows via the switching element during the switched-on phase, such that during the time during which the load path voltage V22 of the switching element 22 rises from the minimum value $V22_{min}$ to the maximum value $V22_{max}$, a current I22 through the switching element 22 decreases from the maximum value $I21_{max}$ to zero. During the switched-off phase, the inductance current I21 flows via the rectifier element 24, where the rectifier element 24 can accept the maximum current $I21_{max}$ after the changeover instant only when the first load path voltage V22 has risen up to a value corresponding to the sum of a forward voltage of the rectifier element 24 and the output voltage Vout. If the first load path voltage V22 rises very rapidly, then a "hard" change occurs in the inductance current I21 from the current path in which the switching element 22 is arranged into the current path in which the rectifier element 24 is arranged. Such a hard change, that is to say a large change in the current flowing through the rectifier element 24 with respect to time, can lead to voltage spikes at parasitic inductances present in the current path with the rectifier element 24. The following applies for such voltage spikes:

$$V = L \cdot \frac{dI24}{dt}. \quad (1)$$

In this case, V denotes the amplitude of the voltage spike, L denotes the inductance value of the parasitic inductances and dI24/dt denotes the change in the current I24 flowing through the rectifier element 24 with respect to time. Parasitic inductances are not explicitly illustrated in FIG. 1. Such parasitic inductances can already be formed by line connections in the current path in which the rectifier element 24 is present.

It follows from the equation (1) that the amplitude of voltage spikes that occur is directly dependent on the change in the current I24 with respect to time. In order to reduce such voltage spikes it is desirable to "flatten" the voltage rise in the first load path voltage V22 toward the end of the transition phase, that is to say shortly before the rectifier element 24 starts to conduct. Furthermore, it is desirable to "flatten" the voltage rise in the load path voltage V22 at the beginning of the transition phase as well.

Figure 3:
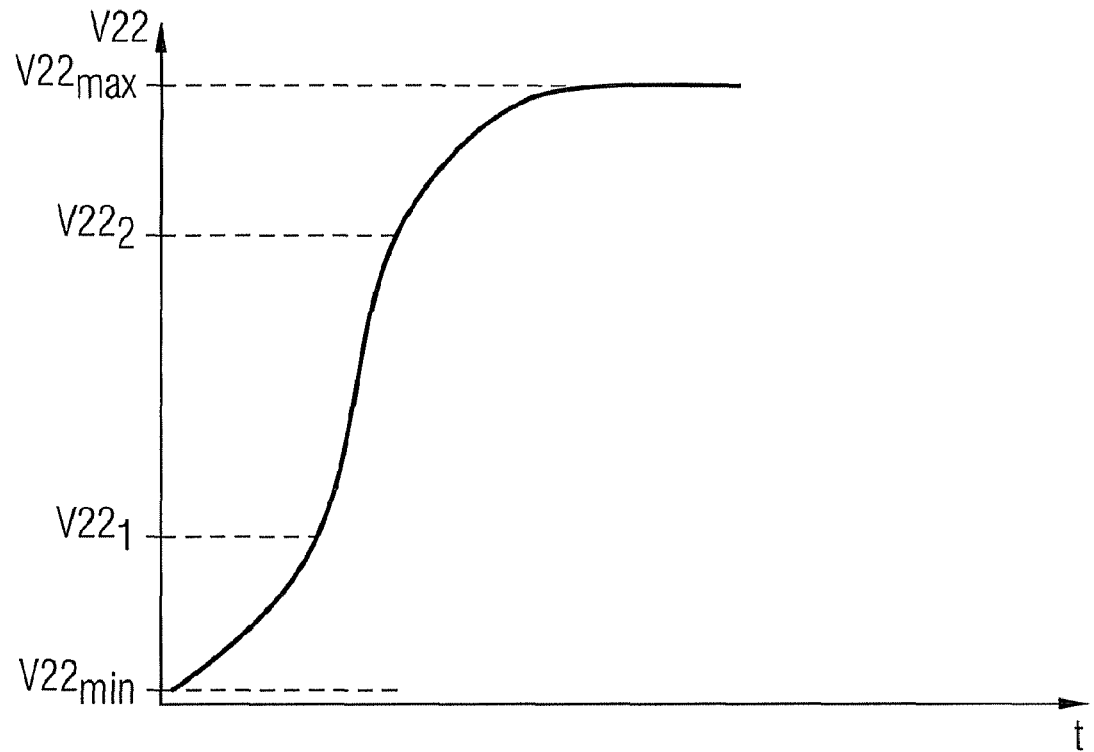
FIG. 3 illustrates the temporal profile of a voltage present across a switching element of the switching converter in the case of the transition from a switched-on phase to a switched-off phase of the switching element.

It is therefore endeavored to cause the rise in the first load path voltage V22 during the transition phase to proceed in three phases: a first phase, in which the voltage V22 rises from the minimum value $V22_{min}$ up to a first voltage value $V22_1$; a second phase, in which the load path voltage V22 rises from the first value $V22_1$ to a second value $V22_2$; and a third phase, in which the load path voltage V22 rises from the second value $V22_2$ to the maximum value $V22_{max}$. Such a rise in the first load path voltage V22 in three phases is illustrated in FIG. 3. A rate of rise, that is to say a change dV22/dt in the load path voltage V22 with respect to time, is in this case intended to proceed more slowly during the first and third phases than during the second phase. In a switching converter having an output voltage Vout of 400V, for example, the first voltage value $V22_1$, which marks the end of the first phase is 100V, for example, and the second value $V22_2$ which marks the end of the second phase, is 300V, for example. Generally, the first voltage value $V22_1$ is for example between 10% and 30% of the maximum value $V22_{max}$ and the second voltage value $V22_2$ is for example between 70% and 90% of the maximum value $V22_{max}$. It should be pointed out that the rate of voltage rise does not have to be constant within the individual phases. The rates of voltage rise that occur during the first and third phases are lower, however, than the rates of voltage rise that occur during the second phase.

Figure 4:
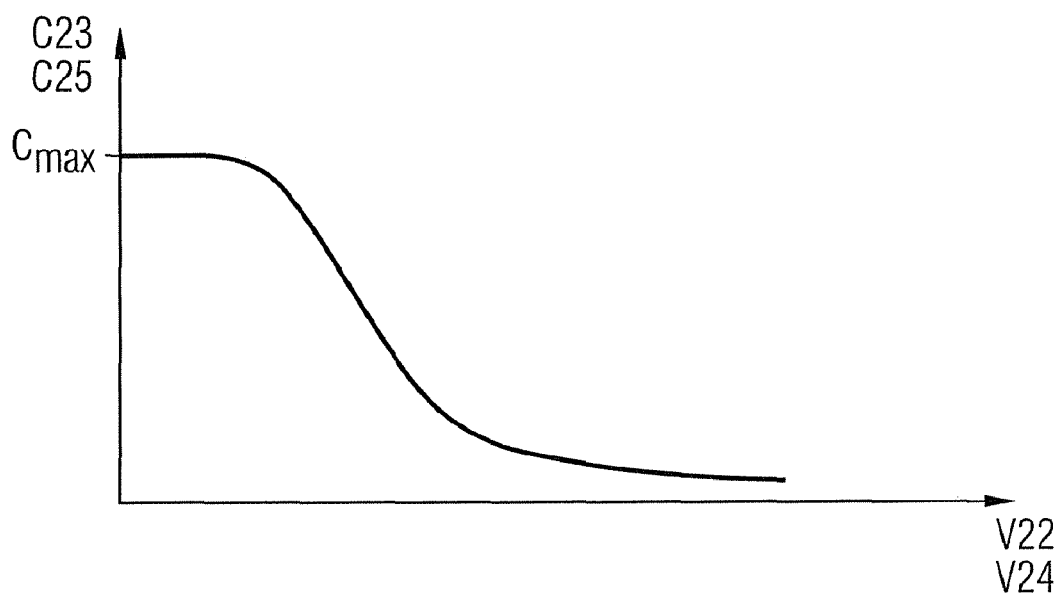
FIG. 4 illustrates capacitance characteristic curves of capacitive components present in the switching converter.

Such a profile of the voltage rise in the first load path voltage V22 in three phases can be achieved by virtue of the fact that a capacitive element 23 having a nonlinear capacitance characteristic curve that is dependent on the voltage V22 between the load path connections 222, 223 of the switching element 22 is provided between the load path connections 222, 223. The capacitance characteristic curve is determined by a dependence of a capacitance C23 of the first capacitive element 23 on the first load path voltage V22. Referring to FIG. 4, the capacitance characteristic curve is for example such that the capacitance C23, starting from a voltage value at which the capacitance C23 has its maximum value $C_{max}$ and which is zero, for example, decreases for increasing voltage values.

A second capacitive element 25 is present between the load path connections 241, 242 of the rectifier element 24, the second capacitive element having a nonlinear capacitance characteristic curve that is dependent on the voltage V24 between the load path connections 241, 242. The capacitance characteristic curve is determined by a dependence of a capacitance C25 of the second capacitive element 25 on the second load path voltage V24. The profile of the capacitance characteristic curve depending on the second load path voltage V24 corresponds qualitatively to the profile of the capacitance characteristic curve of the first capacitive element 23 depending on the voltage V22, such that reference is made to the explanation given above. It should be noted in this context that maximum capacitance values of the first and second capacitive elements 23, 24 and minimum capacitance values of the capacitive elements 23, 24 can differ. Furthermore, the limit value of the voltages V22, V24 at which the capacitances C23, C25 respectively assume their minimum values can also differ. Merely for reasons of simplified illustration, identical maximum values $C_{max}$ and minimum values $C_{min}$ and identical threshold values $V_0$ for the capacitances C23, C25 are assumed in FIG. 4. The effects of such capacitive elements 23, 25 having a voltage-dependent nonlinear capacitance characteristic curve on the voltage rise in the voltage V22 are explained below.

I21$_{max}$ hereafter denotes the value of the inductance current I21 at the instant when the switching element 22 is switched off. Starting from an instant at which the switching element 22 turns off, a rise in the load path voltage V22 is then dependent on this maximum current I21$_{max}$ and the capacitance value C23 of the first capacitive element. The following applies here:

$$\frac{dV22}{dt} = \frac{I21_{max}}{C23(V22)}. \quad (2)$$

In this case, dV22/dt denotes the change in the load path voltage V22 with respect to time, that is to say the rate at which the load path voltage V22 rises. In this case, this rate of rise is all the greater, the greater the maximum value I21$_{max}$ of the inductance current I21 is and the lower the capacitance C23, the capacitance being dependent on the first load path voltage is.

On account of the explained nonlinear dependence of the capacitance C23 on the load path voltage V22 with a large capacitance value for small load path voltages V22, the rate of voltage rise dV22/dt is lower for small load path voltages V22 than for larger load path voltages V22. If the voltage profile in FIG. 3 is considered, than the first voltage value V22$_1$, which marks the end of the first phase, corresponds to the threshold value V$_0$ starting from which the capacitance C23 assumes it minimum value C$_{min}$.

As the first load path voltage V22 across the switching element 22 rises, the second load path voltage V24 across the rectifier element 24 decreases. If the load path voltage V24 decreases to a value starting from which the capacitance C25 of the capacitive element 25 rises, then a voltage rise in the first load path voltage V22 is reduced, to be precise because, as the capacitance C25 of the second capacitive element 25 increases, a discharging process of the capacitive element 25 slows down, whereby the change in the second load path voltage 24 with respect to time also slows down. It should be noted in this context that the first and second load path voltages V22, V24 are directly related to one another by way of the output voltage Vout, where the following applies:

$$V22+V24=Vout \quad (3).$$

Let V$_0$ be the threshold value starting from which the capacitance C25 rises as the second load path voltage V24 decreases. The following then applies for the load path voltage V22 starting from which the third phase begins, that is to say starting from which a slowing down of the voltage rise beings:

$$V22_2=Vout-V_0 \quad (4).$$

If the threshold value V$_0$ differs for the first and second capacitances C23, C25, the threshold value V$_0$ for the second capacitance C25 should be inserted into the equation (4).

Figure 5:
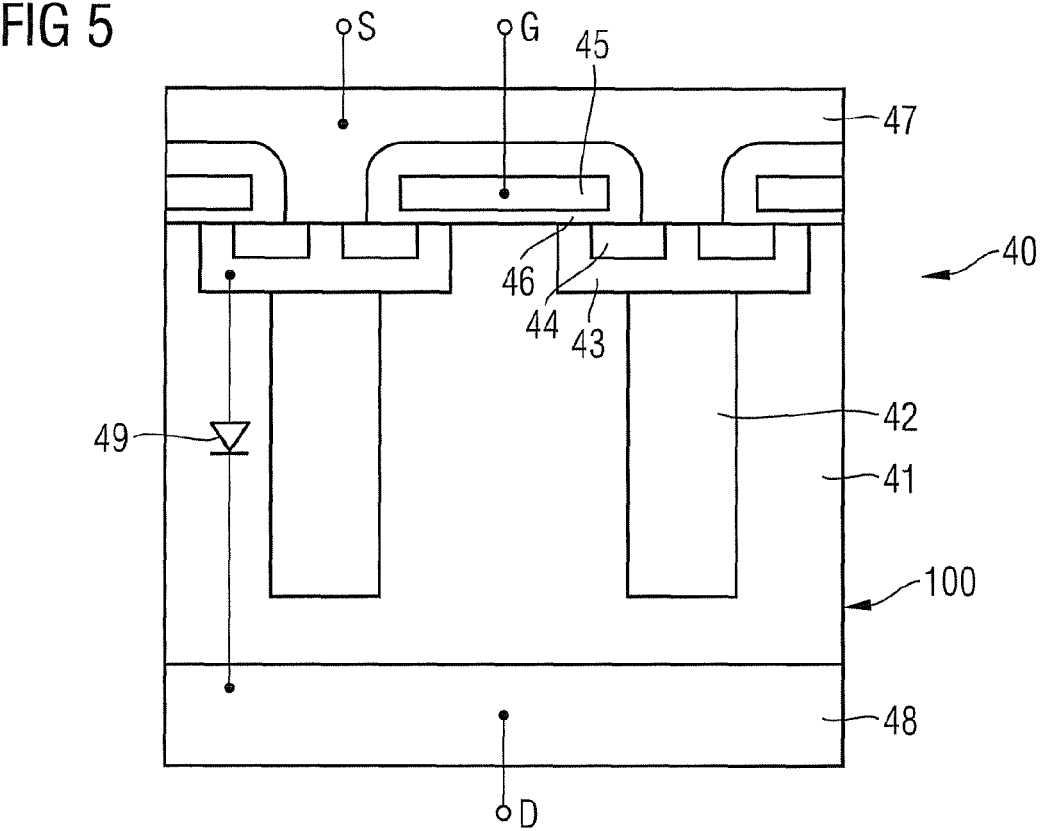
FIG. 5 illustrates one embodiment of a MOS transistor that functions according to the compensation principle, on the basis of a cross section through a semiconductor body.

According to one embodiment, a power MOSFET that functions in accordance with the compensation principle is used as the switching element 22. One example of such a MOSFET is illustrated on the basis of a cross-sectional illustration in FIG. 5. In this case, FIG. 5 illustrates a cross section through a semiconductor body 100 in which the MOSFET is integrated. The MOSFET includes a drift zone 41 of a first conduction type and one or a plurality of compensation zones 42 of a second conduction type, which is complementary to the first conduction type, the compensation zone(s) being arranged in the drift zone 41. The MOSFET used as the switching element 22 is an n-channel MOSFET for example.

In such a MOSFET, the drift zone 41 is n-doped and the compensation zone 42 is p-doped. The MOSFET additionally has a drain zone 48, which is adjacent to the drift zone 41, and which is of the same conduction type as the drift zone 41 but doped more highly. It should be noted in this context that instead of a MOSFET, an IGBT can also be used as the switching element 22. Such an IGBT differs from a MOSFET essentially by virtue of the fact that the drain zone is doped complementarily to the drift zone.

At a side of the drift zone 41 which is remote from the drain zone 48, a body zone 43 is adjacent to the drift zone 41, and is doped complementarily to the drift zone 41. The body zone 43 separates the drift zone 41 from a source zone 44, which is of the same conduction type as the drift zone 41. A gate electrode 45 is present for controlling a conducting channel in the body zone 43 between the drift zone 41 and the source zone 44, which gate electrode is arranged adjacent to the body zone 43 and is dielectrically insulated from the body zone 43, the source zone 44 and the drift zone 41 by a gate dielectric 46. Contact is made with the source zone 44 and the body zone 43 jointly by a source electrode 47, whereby the source zone 44 and the body zone 43 are short-circuited. In this way, a diode 49 is formed between the source electrode 47 and the drain zone 48. This diode, the circuit symbol of which is illustrated in FIG. 5 and designated by the reference symbol 49, is also referred to as a body diode. On account of this body diode, an n-channel MOSFET is able to turn on when a positive voltage is applied between the source electrode 47 and the drain zone 48, without it being necessary for the MOSFET to be driven in the on state via the gate electrode 45 for this purpose. In the case of a p-channel MOSFET, the forward direction of the body diode correspondingly runs from drain to source.

The MOSFET has a drain terminal D connected to the drain zone 48, a source terminal S connected to the source electrode 47, and a gate terminal G connected to the gate electrode 45. These terminals are illustrated merely schematically in FIG. 5. When an n-channel MOSFET is used as the switching element, the drain terminal D of the MOSFET forms the first load path terminal 222, the source terminal S forms the second load path terminal 223 and the gate terminal G forms the control terminal 221.

The functioning of the component illustrated in FIG. 5 is explained below. It shall be assumed for this explanation that the MOSFET is an n-channel MOSFET. The explanation below also applies correspondingly to a p-channel MOSFET, the component zones of which are doped complementarily in comparison with component zones of an n-channel MOSFET. If the polarity of voltages plays a part in the explanation below, then the polarity of the voltages in the case of a p-channel MOSFET should be correspondingly interchanged with respect to voltages in an n-channel MOSFET.

The MOSFET 40 illustrated in FIG. 5 is turned on if a positive voltage is present between drain D and source S, and if at the gate electrode 45 a drive potential is present that is sufficient to form an inversion channel in the body zone 43 between the source zone 44 and the drift zone 41. In the case of an n-channel MOSFET, the drive potential is an electrical potential that is positive with respect to source potential. The MOSFET is turned off if a positive voltage is present between drain D and source S, and if a drive potential suitable for forming an inversion channel is not present at the gate electrode 45. In this case, the pn junction between the drift zone 41 and the body zone 43 is reverse-biased, such that a space charge zone is formed in the drift zone 41 proceeding from the pn junction. In the case of a MOSFET, as is known, the drift zone 41 serves to take up a reverse voltage present between drain and source D, S. pn junctions are additionally formed between the compensation zones 42 and the drift zone 41. In the example illustrated, the compensation zones 42 are connected to the body zone 43, such that when a reverse voltage is applied, space charge zones are also formed directly proceeding from the pn junctions between the compensation zones 42 and the drift zone 41. In a manner not illustrated in more specific detail, the compensations zones 42 can also be arranged in floating fashion at the drift zone 41. In this case, space charge zones then propagate proceeding from the pn junctions between the compensation zones and the drift zone 41 if a space charge zone propagating in the drift zone 41 encroaches on the respective compensation zone. The compensation zones 42 serve, when the component is driven in the off state, for partly or completely compensating for the dopant charges present in the drift zone 41. As a result of this, in comparison with components without such compensation zones, a higher doping can be provided in the drift zone 41, whereby the on resistance of the component can be reduced without, however, reducing the dielectric strength. The total net dopant charge present in the compensations zones 42 ideally corresponds to the total net dopant charge present in the drift zone 41.

In connection with the present description, a compensation component should be understood to mean a component having a drift zone in which one or a plurality of compensation zones 42 present complementarily to the drift zone 41 are provided, and in the case of which the net dopant charge present in the compensation zones amounts to between 80% and 120% of the net dopant charge of the drift zone 41.

The pn junctions between the body zone 43 and the compensation zone 42, on the one hand, and the drift zone 41, on the other hand, form a capacitance when the component is driven in the off state, the capacitance also being referred to as junction capacitance or space charge zone capacitance. In comparison with conventional components, compensation components have a large-area pn junction, and hence a pronounced junction capacitance. Owing to this large-area pn junction, such components are also referred to as superjunction components. The junction capacitance is dependent on the voltage present between drain D and source S and decreases as the drain-source voltage increases, that is to say the further the space charge zone of the drift zone 41 propagates when the component is in the off state. This junction capacitance can be used directly as the capacitive element 23. The function of the switching element 22 and of the capacitance 23 that is effective between the load path connections 222, 223 of the switching element 22 and has a voltage-dependent nonlinear capacitance characteristic curve can thus be achieved by using a MOSFET that functions according to the compensation principle as the switching element 22. In this case, the capacitive element 23 is directly part of the MOSFET.

It should be noted that FIG. 5 merely serves for elucidating the basic principle of a compensation MOSFET. It goes without saying that MOSFETs having a geometry that deviates from the geometry illustrated in FIG. 5 can be used. Thus, by way of example, instead of the illustrated planar gate electrode 45 arranged above a front side of the semiconductor body 100, a trench electrode arranged in a trench extending into the semiconductor body 100 proceeding from a front side could also be provided. Such component geometries are sufficiently known, and so further explanations in this respect are not required. Finally, it should also be mentioned that the MOSFET in order to increase the current-carrying capacity, has a multiplicity of transistor cells of identical type, each having a body zone 43 and a source zone 44. In this case, the individual transistor cells are connected in parallel by their source and body zones 44, 43 being short-circuited by the source electrode 47. In this case, the drift zone 41 and the drain zone 48 are common to all the transistor cells. The individual transistor cells can have any conventional cell geometry, such as a hexagonal geometry, for example. In this case, the body zones 43 have a hexagonal geometry in a sectional plane running perpendicular to the plane of the drawing illustrated in FIG. 5. The gate electrode 45 is common to all the transistor cells and has cutouts in the region of the source and body zones 44, 43, in the region of which cutouts the source electrode 47 makes contact with the source and body zones 44, 43.

Figure 6:
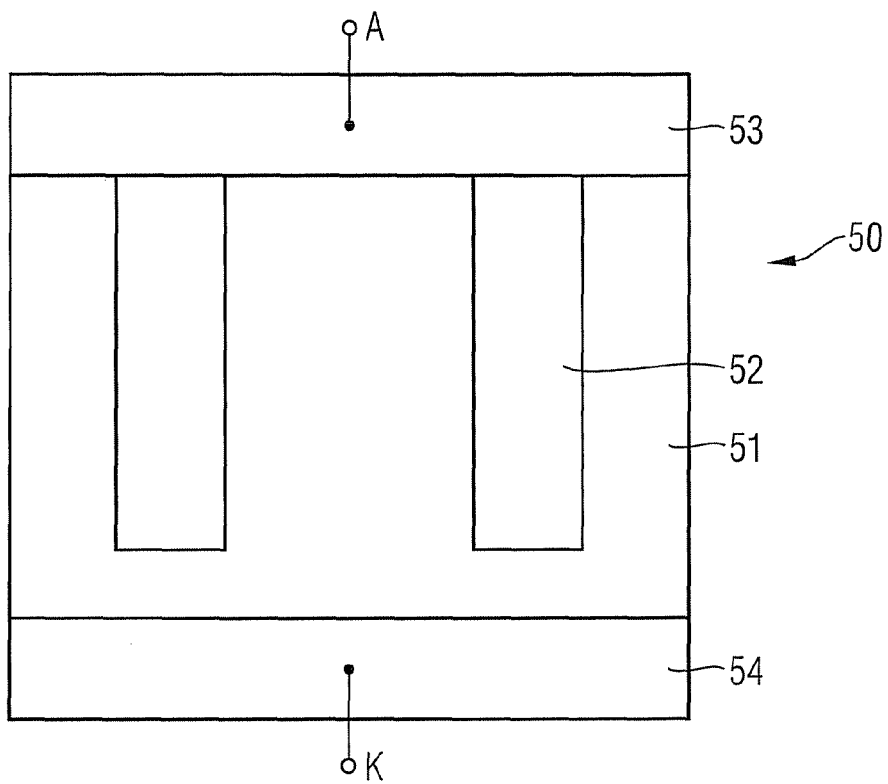
FIG. 6 illustrates one embodiment of a bipolar diode that functions according to the compensation principle, on the basis of a cross section through a semiconductor body.

A bipolar diode that functions according to the compensation principle can be used as the rectifier element 24. In this case, the rectifier element 24 and the second capacitive component 25 are realized by a single component, namely the bipolar diode that functions according to the compensation principle. FIG. 6 illustrates a schematic illustration of an example of such a bipolar diode 50 that functions according to the compensation principle. FIG. 6 illustrates a cross section through a semiconductor body 100 in which component zones of the bipolar diode are realized.

The diode 50 has two emitter zones 53, 54, which are doped complementarily to one another and between which is arranged a drift zone 51 doped more lightly than the emitter zones 53, 54. Compensation zones 52 doped complementarily to the drift zone 51 are arranged in the drift zone 51, which compensation zones are either arranged in floating fashion in the drift zone 51 or are connected to the emitter zone that is doped complementarily to the drift zone 51 (as illustrated). In the example illustrated, this is the first emitter zone 53. That one of the two emitter zones 53, 54 which is p-doped forms an anode zone of the diode 50, and the other one of the two emitter zones, which is n-doped, forms a cathode zone. The forward direction of the diode 50 runs from the anode A to the cathode K, that is to say that the component is driven in the on state when a positive voltage is applied between anode A and cathode K, and is driven in the off state when a positive voltage is applied between cathode K and anode A. When the diode 50 illustrated in FIG. 6 is used as rectifier element 24 in the switching converter in accordance with FIG. 1, the diode is to be connected up in such a way that the cathode connection K forms the first load path connection 241 and the anode connection A forms the second load path connection 242.

In the case of a positive second load path voltage V24, this diode is reverse-biased. A space charge zone then propagates proceeding from the pn junctions between the first emitter zone 53 and the compensation zone 52, on the one hand, and the drift zone 51, on the other hand. In this case, the capacitive element 25 having a voltage-dependent nonlinear capacitance characteristic curve is formed by the junction capacitance of this pn junction, which decreases as the reverse voltage rises or increases as the reverse voltage decreases.

Figure 12:
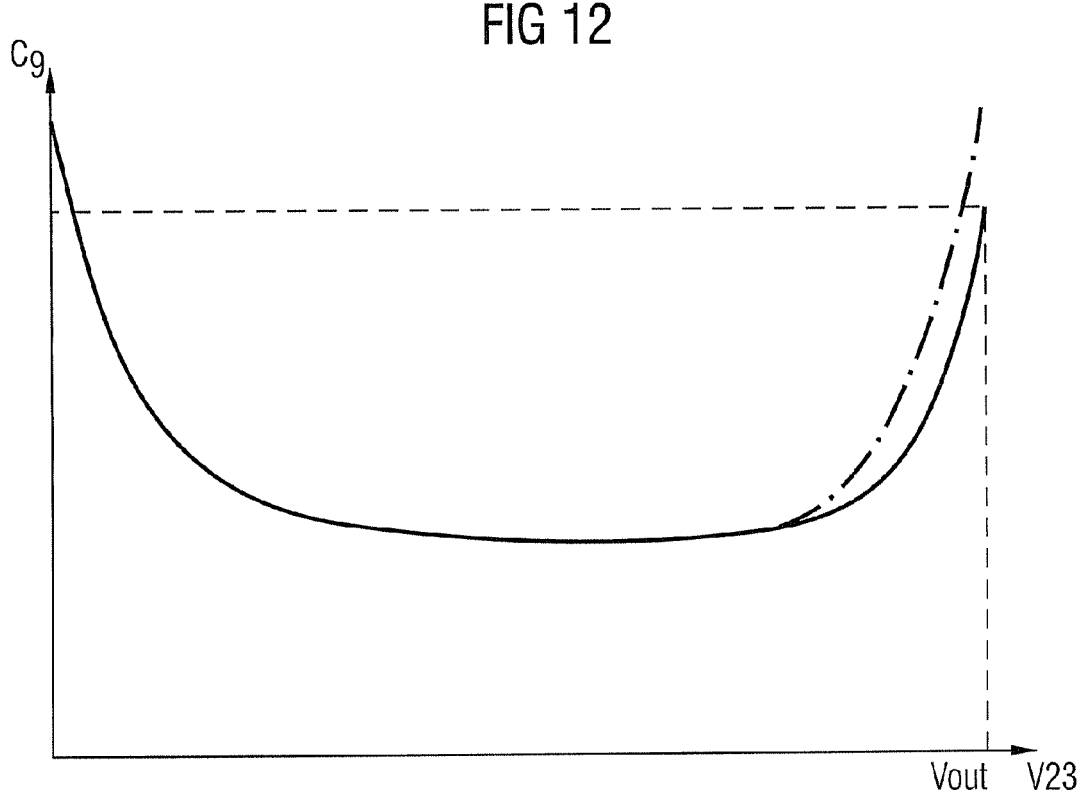
FIG. 12 illustrates the voltage-dependent profile of an effective capacitance present at a circuit node in the switching converter.

When using a compensation MOSFET as the switching element 22 and a compensation bipolar diode 50 as the rectifier element 24, it is possible to obtain capacitive elements 23, 25 having an approximately identical capacitance characteristic curve by using the dimensions and dopings of the drift zones 41, 51 and of the compensation zones 42, 52 being chosen to be respectively identical for the production of the compensation MOSFET and for the production of the bipolar diode. However, the capacitive components need not necessarily have identical capacitance characteristic curves. FIG. 12 schematically illustrates the profile of the capacitance value Cg of an effective capacitance that is effective at the circuit node common to the switching element 22 and the rectifier element 24, assuming that these two components are compensation components having voltage-dependent output capacitances.

The effective capacitance is composed of the capacitance values of the voltage-dependent output capacitances 23, 25 of the switching element 22 and of the rectifier element 24 together and is plotted as a function of the voltage V22 present across the switching element 21 in FIG. 12. In the case of small voltage values of the voltage V22, the capacitance value of the capacitance is crucially determined by the output capacitance 23 of the first semiconductor switching element 21, which has its maximum value at a voltage V21 of zero. Correspondingly, in the case of large voltage values of the voltage V21, the capacitance value of the effective capacitance is crucially determined by the output capacitance 24 of the rectifier element 24. The output capacitance assumes its maximum value if the voltage across the rectifier element 24 is zero, that is to say if the voltage V22 across the first semiconductor switching element 21 corresponds to the output voltage Vout. A minimum of the capacitance value of the effective capacitance is at a voltage V21 of between zero and the output voltage Vout.

The solid line in FIG. 12 illustrates an "asymmetrical" case where one of the output capacitances—that of the rectifier element 24 in the example—has a smaller maximum capacitance value than the other output capacitance. The dash-dotted line in FIG. 12 illustrates a "symmetrical" case where both output capacitances have an identical maximum capacitance value.

Figure 7:
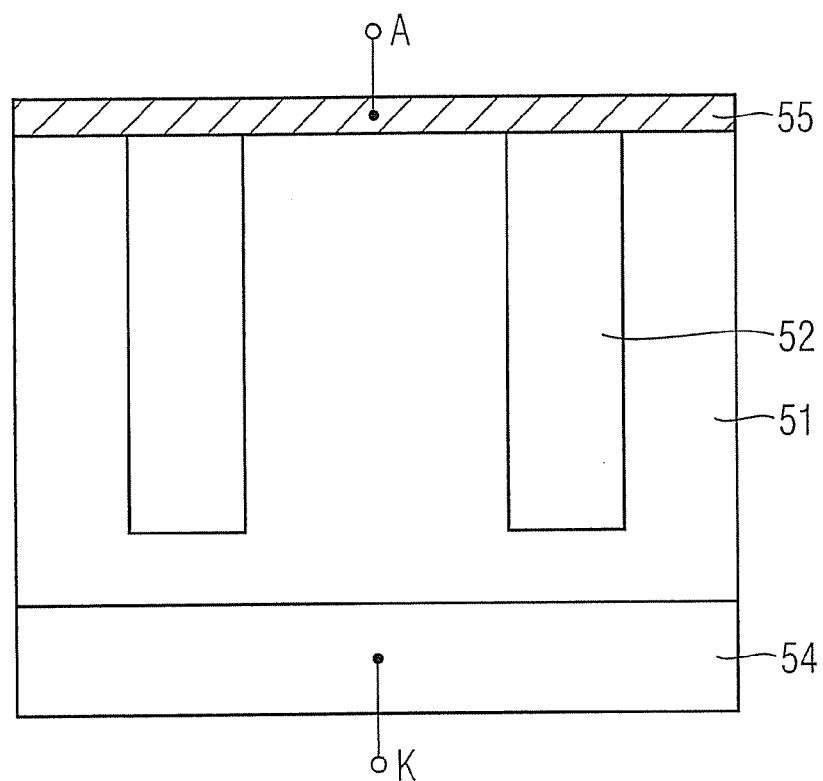
FIG. 7 illustrates one embodiment of a Schottky diode that functions according to the compensation principle, on the basis of a cross section through a semiconductor body.

A Schottky diode can also be used instead of a bipolar diode as rectifier element. Referring to FIG. 7, which illustrates a schematic illustration of a cross section through a Schottky diode, such a Schottky diode differs from a bipolar diode by virtue of the fact that a metal layer 55 is provided instead of the emitter zone (53 in FIG. 6) doped complementarily to the drift zone 41, which metal layer forms a Schottky junction with the semiconductor material of the drift zone 51. A suitable material for this is for example platinum (Pt), tungsten (W) or aluminum (Al). The semiconductor body 100 is composed for example of silicon (Si) or silicon carbide (SiC). A Schottky diode has the advantage over a bipolar diode of a lower forward voltage.

Figure 8:
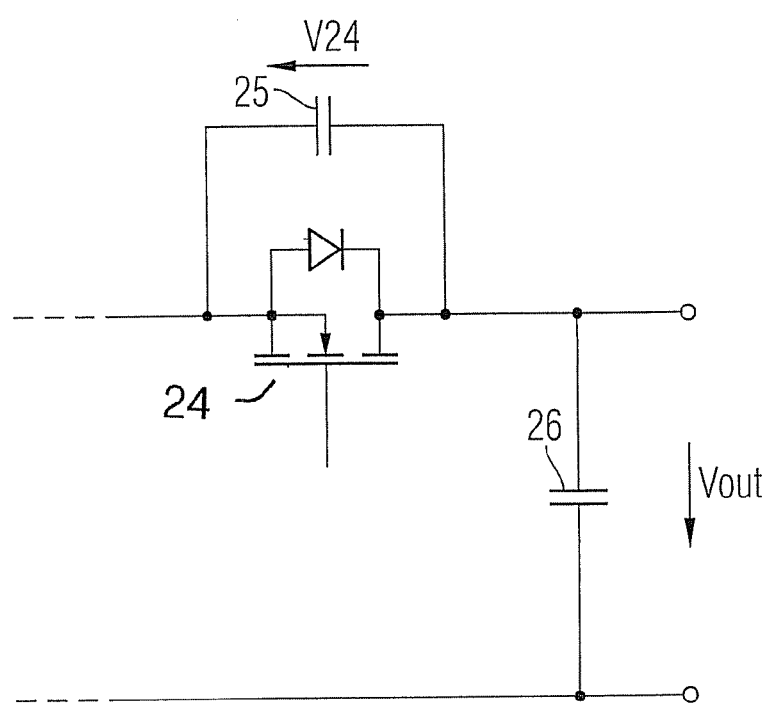
FIG. 8 partially illustrates an electrical equivalent circuit diagram of a switching converter modified by comparison with the switching converter in accordance with FIG. 1.

Referring to FIG. 8, which illustrates an excerpt from the electrical equivalent circuit diagram of a boost converter, instead of a diode as rectifier element 24 it is also possible to provide a compensation MOSFET as rectifier element, which compensation MOSFET is connected up in such a way that its body diode acts as a rectifier element and accepts the inductance current 21 when the switching element 22 is driven in the off state. The gate electrode G of the MOSFET can remain unconnected in this case. Furthermore, there is the possibility of such a MOSFET used as rectifier element 24 being operated as an active rectifier element, that is to say of the MOSFET being driven in the on state during the switched-off phase of the switching element 22 starting from an instant from which it is ensured that the switching element 22 is reliably turned off. The MOSFET used as rectifier element 24 can be still be switched off during the above-explained transition phase during which the first load path voltage V22 rises to approximately the value of the output voltage Vout and during which the second load path voltage V24 decreases. During this phase, the body diode accepts an inductance current 21 that is possibly already flowing. The MOSFET used as rectifier element 24 can be driven in the on state for example after the conclusion of the transition phase and is in each case driven in the off state before the switching element 22 is driven in the on state at the beginning of a next driving phase.

It goes without saying that the concept explained above, namely of providing capacitive elements having voltage-dependent nonlinear capacitance characteristic curves between load paths of a switching element and of a rectifier element in a switching converter, is not restricted to the boost converter explained above. All the explanations given above with regard to the capacitive elements, and in one embodiment with regard to the possibilities for realizing them, apply to any switching converter topologies, such as, for example, buck converters, buck-boost converters or flyback converters.

Figure 9:
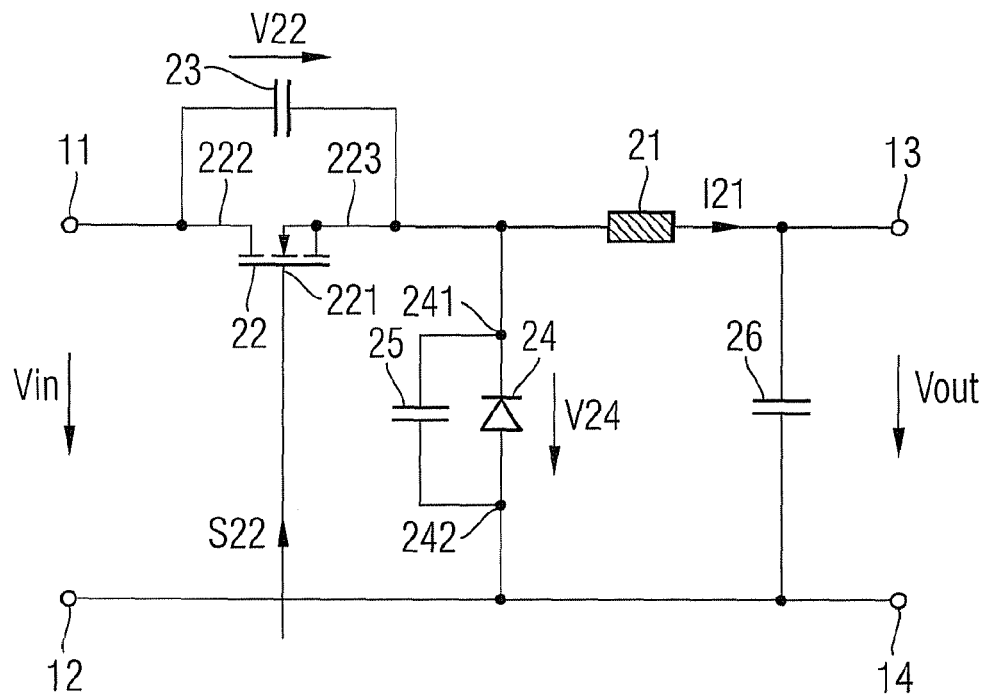
FIG. 9 illustrates one embodiment of a switching converter on the basis of an electrical equivalent circuit diagram.

FIG. 9 illustrates the electrical equivalent circuit diagram of a buck converter. In the case of this buck converter, the switching element 22 is connected in series with the inductive storage element 21 and the capacitive storage element 26 between the input terminals 11, 12. As in the boost converter in accordance with FIG. 1, the output voltage is present across the capacitive storage element 26 connected between the output terminals 13, 14. The rectifier element 24 is connected in parallel with a series circuit including the inductive storage element 21 and the capacitive storage element 26. The signal profiles illustrated in FIG. 2 for the drive signal S22, the first load path voltage V22 and the second load path voltage V24 correspondingly apply to the buck converter illustrated in FIG. 9. During the switched-on phase, the input voltage Vin is present across the series circuit including the switching element 22, the inductive storage element 21 and the capacitive storage element 26. In this case, the voltage present across the inductive storage element 21 approximately corresponds to the difference between the input voltage Vin and the output voltage Vout, where the input voltage Vin—in contrast to a boost converter—is greater than the output voltage Vout. The inductive storage element 21 is magnetized during this switched-on phase. During a subsequent switched-off phase, the rectifier element 26 accepts the inductance current I21 flowing through the inductive storage element 21. During the switched-off phase, the load path voltage V22 assumes its maximum value $V22_{max}$ corresponding to the sum of the input voltage Vin and the forward voltage of the rectifier element 24. During the preceding switched-on phase, the second load path voltage V24 assumes its maximum value $V24_{max}$ approximately corresponding to the input voltage Vin.

In the transition phase from the switched-on phase to the switched-off phase, the first load path voltage V22 rises to the abovementioned maximum value $V22_{max}$, while the second load path voltage V24 decreases proceeding from the abovementioned maximum value $V24_{max}$. During this transition phase, the first and second capacitances 23, 25 influence the voltage rise in the first load path voltage V22 in the manner explained, thereby reducing for example voltage spikes which can occur at parasitic inductances in the current path with the rectifier element 24 when the rectifier element 24 accepts the inductance current I21.

Figure 10:
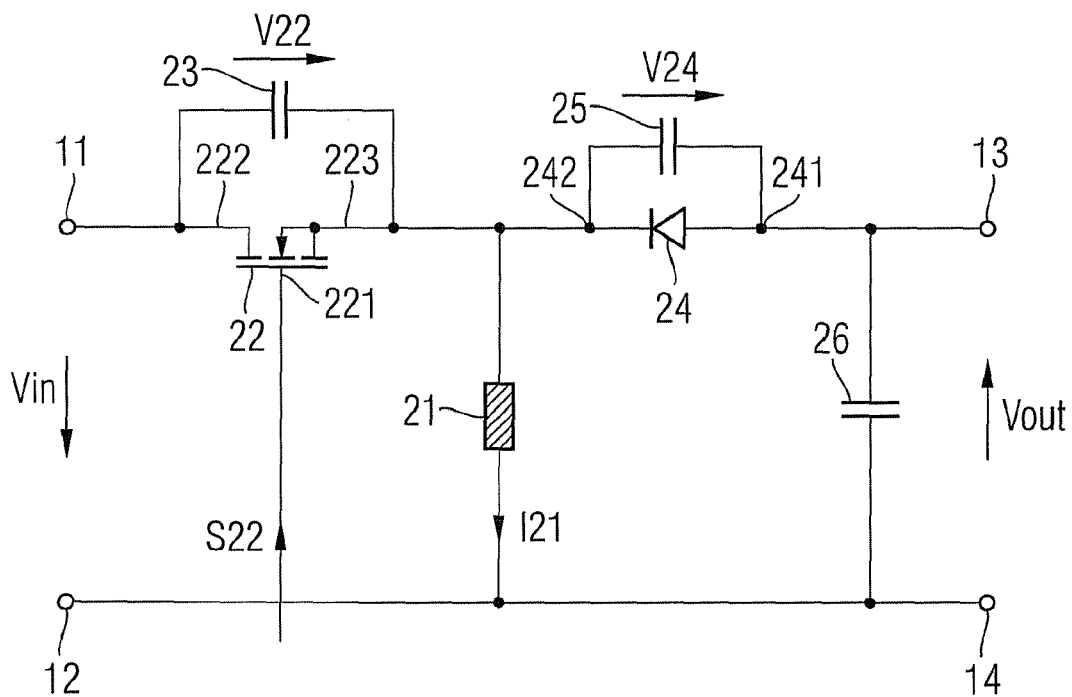
FIG. 10 illustrates one embodiment of a switching converter on the basis of an electrical equivalent circuit diagram.

Referring to FIG. 10, the concept explained above can also be applied for example to a buck-boost converter. With regard to its topology, the buck-boost converter differs from the buck converter illustrated in FIG. 9 by virtue of the fact that the positions of the inductive storage element 21 and of the rectifier element 24 in the circuit topology are interchanged. The inductive storage element 21 is therefore connected in series with the switching element 22 between the input terminals 11, 12, while a series circuit including the rectifier element 24 and the capacitive storage element 22 is connected in parallel with the inductive storage element 21. In this case, the rectifier element 24 is connected in the forward direction between the capacitive storage element 26 and the inductive storage element 21. In this buck-boost converter—in contrast to the boost converter explained above and the buck converter explained above—the output voltage Vout is of opposite polarity to the input voltage Vin.

Figure 2:
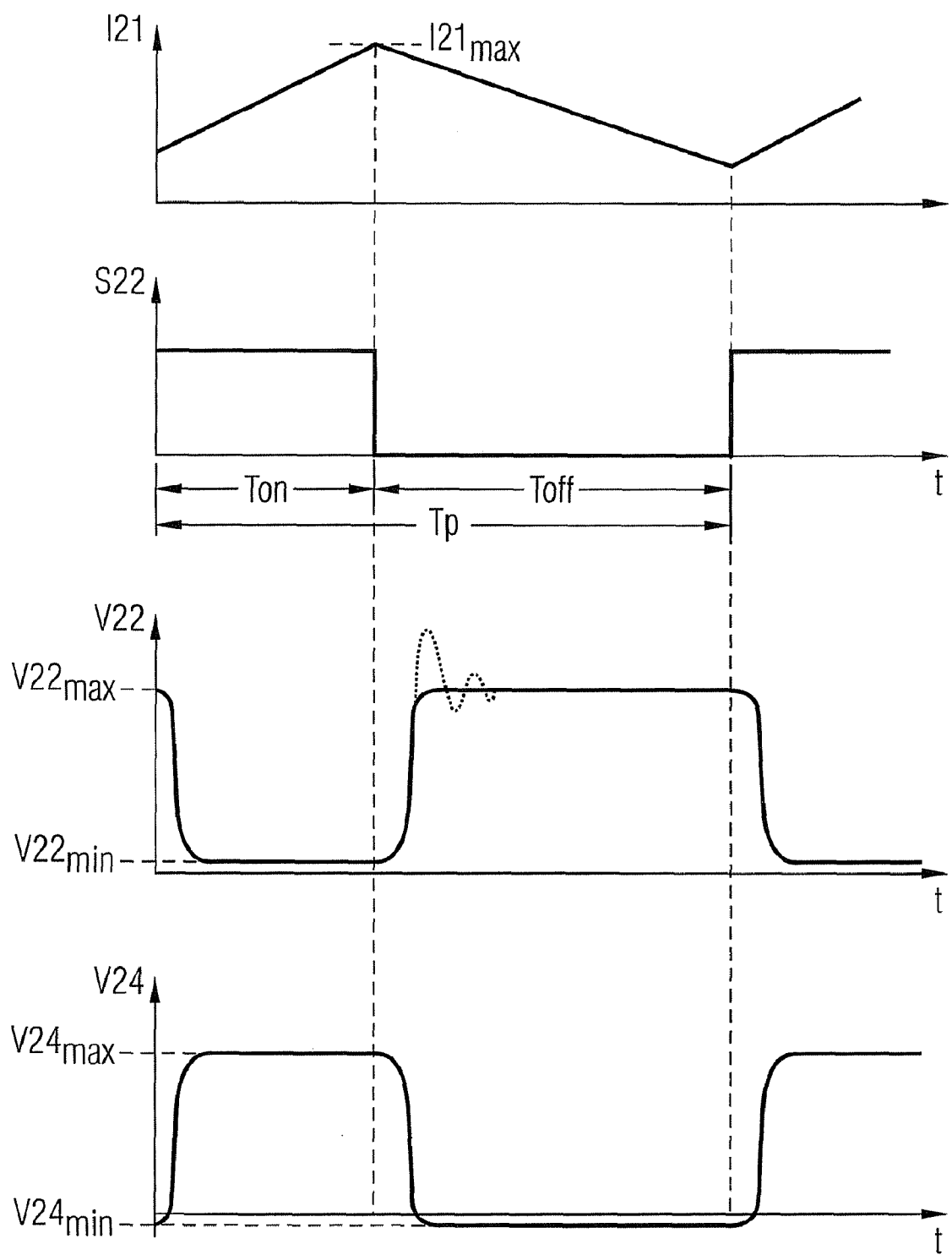
FIG. 2 illustrates temporal profiles of some signals that occur in the switching converter.

The signal profiles illustrated in FIG. 2 for the drive signal S22 and also the first and second load path voltages V22, V24 correspondingly apply to the switching converter in accordance with FIG. 10.

Figure 11:
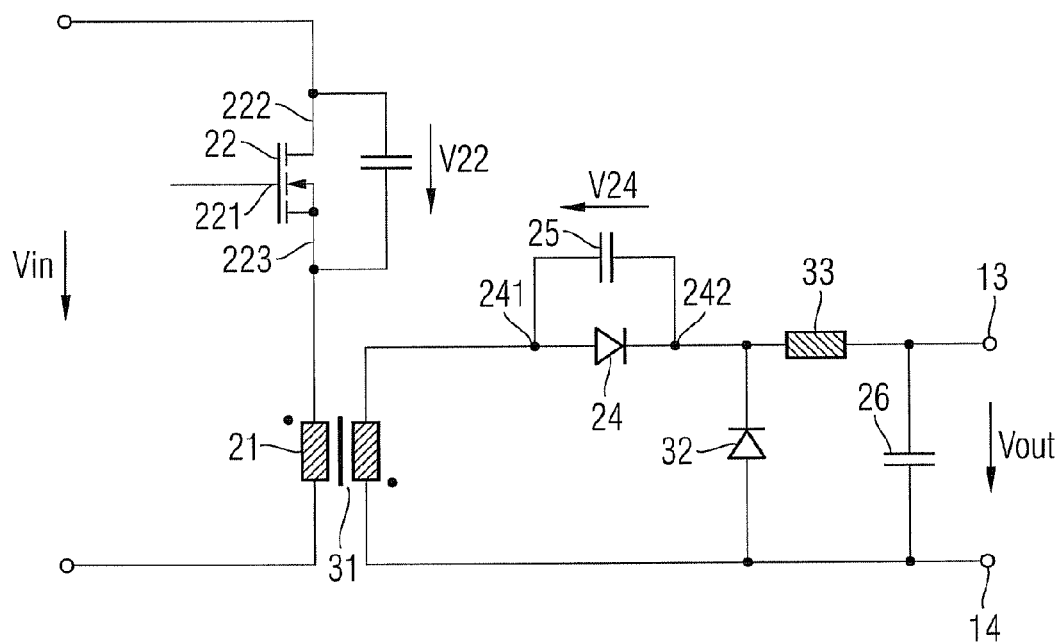
FIG. 11 illustrates one embodiment of a switching converter on the basis of an electrical equivalent circuit diagram.

FIG. 11 illustrates a flyback converter as a further example of a switching converter. In the case of this flyback converter, the inductive storage element 21 is part of a transformer and forms a primary winding of the transformer, to which a secondary winding 31 is inductively coupled. The inductive storage element 21 is connected in series with the switching element 22 between the input terminals 11, 12. A series circuit including the rectifier element 24 and the capacitive storage element 26 is connected in parallel with the secondary winding 31. Optionally, a further inductive storage element 33 can be connected in the series circuit between the rectifier element 24 and the capacitive storage element 26. In this case, a further rectifier element 32 is provided, which is then connected in parallel with a series circuit including the further inductive storage element and the capacitive storage element 26. An output voltage Vout is present across the capacitive storage element 26.

During the switched-on phase of the switching element 22, the input voltage Vin is present across the inductive storage element 21 and the storage element 21 is magnetized. During this switched-on phase, a voltage related to the input voltage Vin by way of a turns ratio between primary winding 21 and secondary winding 31 is present across the secondary winding 31. However, the primary winding 21 and the secondary winding of the transformer have an opposite winding sense such that, during the switched-on phase, the voltage across the secondary winding has a polarity such that the rectifier element 24 is turned off.

During the switched-off phase, the polarity of a voltage across the inductive storage element is reversed relative to the switched-on phase. In this case, the magnitude of the voltage is dependent on the output voltage and the turns ratio between primary and secondary windings 21, 31. In this case, the maximum first load path voltage $V22_{max}$ present across the switching element 22 during the switched-off phase corresponds to the sum of the input voltage Vin and the voltage present across the primary winding. The maximum second load path voltage $V24_{max}$ present across the rectifier element during the switched-on phase corresponds to the voltage across the secondary winding 31 if no further inductive storage element 33 is present, and to the sum of the voltage across the secondary winding 31 and the output voltage Vout if a further inductive storage element 33 is present.

In the transition phase from the switched-on phase to the switched-off phase, the first load path voltage V22 rises to the abovementioned maximum value $V22_{max}$ while the second load path voltage V24 decreases proceeding from the abovementioned maximum value $V24_{max}$. During this transition phase, the first and second capacitances 23, 25 influence the voltage rise in the first load path voltage V22 in the manner explained, thereby reducing for example voltage spikes which can occur at parasitic inductances in the current path with the rectifier element 24 when the rectifier element 24 accepts the inductance current I21. In this case, the temporal profile of the second load path voltage V24, which profile is influenced by the second capacitive element, influences the voltage across the secondary winding 31. In this case, this voltage across the secondary winding 31 in turn influences the temporal profile of the voltage across the primary winding 21, which profile in turn influences the temporal profile of the first load path voltage V22. In this way, the second capacitive element can influence the desired slowing down of the rate of rise of the first load path voltage V22 toward the end of the transition phase.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switching converter comprising:
    an inductive storage element and a capacitive storage element;
    a switching element;
    a first capacitive element between load path terminals of the switching element, and having a nonlinear capacitance characteristic curve dependent on a voltage between the load path terminals;
    a rectifier element, coupled between the inductive storage element and the capacitive storage element and having a load path; and
    a second capacitive element between the load path terminals of the rectifier element and having nonlinear capacitance characteristic curve dependent on a voltage between the load path terminals.

2. The switching converter of claim 1, comprising wherein the switching element is a MOS transistor that functions according to a compensation principle, and wherein the first capacitive element is an integral part of the MOS transistor.

3. The switching converter of claim 2, comprising wherein the rectifier element is a diode that functions according to a compensation principle, and wherein the second capacitive element is an integral part of the diode.

4. The switching converter of claim 3, comprising wherein the diode is a bipolar diode.

5. The switching converter of claim 3, comprising wherein the diode is a Schottky diode.

6. The switching converter of claim 1, comprising wherein the capacitance characteristic curve of the first capacitive element decreases from an initial value as the load path voltage of the switching element increases and wherein the capacitance characteristic curve of the second capacitive element decreases proceeding from an initial value as the load path voltage of the rectifier element increases.

7. The switching converter of claim 6, comprising wherein the switching element and the rectifier element have at least approximately identical capacitance characteristic curves.

8. The switching converter of claim 1, embodied as a boost converter or as a buck-boost converter, wherein the switching element is coupled in series with the inductive storage element between input terminals, and a series circuit comprising the rectifier element and the capacitive storage element is coupled in parallel with the switching element.

9. The switching converter of claim 1, embodied as a buck converter, wherein a series circuit comprising the switching element, the inductive storage element and the capacitive storage element is coupled between input terminals, and the rectifier element is coupled in parallel with a series circuit comprising the inductive storage element and the capacitive storage element.

10. The switching converter of claim 1, embodied as a flyback converter, wherein the switching element is coupled in series with the inductive storage element between input terminals, the inductive storage element forms the primary winding of a transformer having a primary winding and a secondary winding, a series circuit comprising the rectifier element and the capacitive storage element is coupled in parallel with the secondary winding of the transformer.

11. The switching converter of claim 10, further comprising:
    a further inductive storage element, coupled in series with the rectifier element and the capacitive storage element; and
    a further rectifier element, coupled in parallel with a series circuit comprising the further inductive storage element and the capacitive storage element.

12. A switching converter comprising:
    an inductive storage element and a capacitive storage element;

a switching element, which can be driven in the on state and in the off state, and has a control terminal and a first and a second load path terminal;

a first capacitive element, effective between the load path terminals of the switching element and has a nonlinear capacitance characteristic curve dependent on a voltage between the load path connections;

a rectifier element, connected between the inductive storage element and the capacitive storage element such that it enables a current flow between the inductive storage element and the capacitive storage element when the switching element is driven in the off state, and having a load path; and a second capacitive element, effective between the load path terminals of the rectifier element and having nonlinear capacitance characteristic curve dependent on a voltage between the load path connections.

13. The switching converter of claim 12, comprising wherein the switching element is a MOS transistor that functions according to the compensation principle, and wherein the first capacitive element is an integral part of the MOS transistor.

14. The switching converter of claim 13, comprising wherein the rectifier element is a diode that functions according to the compensation principle, and wherein the second capacitive element is an integral part of the diode.

15. The switching converter of claim 14, comprising wherein the diode is a bipolar diode.

16. The switching converter of claim 14, comprising wherein the diode is a Schottky diode.

17. The switching converter of claim 12, comprising wherein the capacitance characteristic curve of the first capacitive element decreases from an initial value as the load path voltage of the switching element increases and wherein the capacitance characteristic curve of the second capacitive element decreases proceeding from an initial value as the load path voltage of the rectifier element increases.

18. The switching converter of claim 17, comprising wherein the switching element and the rectifier element have at least approximately identical capacitance characteristic curves.

19. The switching converter of claim 12, embodied as a boost converter or as a buck-boost converter, wherein the switching element is coupled in series with the inductive storage element between input terminals, and a series circuit comprising the rectifier element and the capacitive storage element is coupled in parallel with the switching element.

20. The switching converter of claim 12, embodied as a buck converter, wherein a series circuit comprising the switching element, the inductive storage element and the capacitive storage element is coupled between input terminals, and the rectifier element is coupled in parallel with a series circuit comprising the inductive storage element and the capacitive storage element.

21. The switching converter of claim 12, embodied as a flyback converter, wherein the switching element is coupled in series with the inductive storage element between input terminals, the inductive storage element forms the primary winding of a transformer having a primary winding and a secondary winding, a series circuit comprising the rectifier element and the capacitive storage element is coupled in parallel with the secondary winding of the transformer.

22. The switching converter of claim 21, further comprising:

a further inductive storage element, coupled in series with the rectifier element and the capacitive storage element; and a further rectifier element, coupled in parallel with a series circuit comprising the further inductive storage element and the capacitive storage element.

23. A switching converter comprising:

an inductive storage element and a capacitive storage element;

means for switching between an on state and an off state;

means for providing a first capacitive between load path terminals of the switching element, and having a nonlinear capacitance characteristic curve dependent on a voltage between the load path terminals;

a rectifier element, coupled between the inductive storage element and the capacitive storage element and having a load path; and means for providing a second capacitive between the load path terminals of the rectifier element and having nonlinear capacitance characteristic curve dependent on a voltage between the load path terminals.

24. An integrated circuit including a switching converter comprising:

a switching element;

a first capacitive element between load path terminals of the switching element, and having a nonlinear capacitance characteristic curve dependent on a voltage between the load path terminals;

a rectifier element, coupled between the inductive storage element and the capacitive storage element and having a load path; and a second capacitive element between the load path terminals of the rectifier element and having nonlinear capacitance characteristic curve dependent on a voltage between the load path terminals.

25. A method of operating a switching converter comprising:

providing an inductive storage element and a capacitive storage element;

providing a first capacitive element, between the load path terminals of the switching element and has a nonlinear capacitance characteristic curve dependent on a voltage between the load path connections;

providing a second capacitive element, between the load path terminals of the rectifier element and having nonlinear capacitance characteristic curve dependent on a voltage between the load path connections;

driving a switching element in the on state and in the off state, having a control terminal and a first and a second load path terminal; and enabling a rectifier element between the inductive storage element and the capacitive storage element, such that it enables a current flow between the inductive storage element and the capacitive storage element when the switching element is driven in the off state, and having a load path.

\* \* \* \* \*